United States Patent
Gilson et al.

[11] Patent Number: 6,129,421
[45] Date of Patent: Oct. 10, 2000

[54] FOLDABLE HALO STYLE HEADREST

[75] Inventors: Todd J. Gilson; Matthew S. Baldassarre, both of Livonia; Chuck Sisunik, Oxford, all of Mich.

[73] Assignee: Lear Corporation, Southfield, Mich.

[21] Appl. No.: 09/368,872

[22] Filed: Aug. 5, 1999

[51] Int. Cl.$^7$ .................................................. B60N 2/48
[52] U.S. Cl. .......................................... 297/408; 297/403
[58] Field of Search .................................... 297/391, 403, 297/408

[56] References Cited

U.S. PATENT DOCUMENTS

| | | | |
|---|---|---|---|
| 4,351,563 | 9/1982 | Hattori | 297/408 |
| 4,674,792 | 6/1987 | Tamura et al. | 297/408 |
| 4,685,737 | 8/1987 | Deley et al. | 297/403 X |
| 4,822,102 | 4/1989 | Duvenkamp . | |
| 5,199,765 | 4/1993 | Garmendia et al. . | |
| 5,531,505 | 7/1996 | Baetz et al. . | |
| 5,664,841 | 9/1997 | Dal Monte . | |
| 5,667,275 | 9/1997 | Takadea | 297/391 X |
| 5,669,668 | 9/1997 | Leuchtmann | 297/403 X |
| 5,695,252 | 12/1997 | Schmidt et al. . | |
| 5,752,742 | 5/1998 | Kerner et al. . | |
| 5,765,918 | 6/1998 | Wakamatsu et al. . | |
| 5,816,657 | 10/1998 | Hecht et al. . | |

FOREIGN PATENT DOCUMENTS

| | | |
|---|---|---|
| 0 113 645 | 7/1984 | European Pat. Off. . |
| 2 037 154 | 7/1980 | United Kingdom . |

*Primary Examiner*—Peter R. Brown
*Attorney, Agent, or Firm*—Brooks & Kushman P.C.

[57] ABSTRACT

A vehicle seat assembly includes a seat back with a support post vertically adjustable with respect to the seat back. A cushioned base is non-movably mounted to the support post and covered by a trim cover material. The base includes first and second ends. A U-shaped headrest has opposing ends pivotally connected to the first and second ends of the base, respectively. The U-shaped headrest is covered by a trim cover material and is pivotally movable between an upright position for use and a horizontal position for seat tumbling. The base and U-shaped headrest cooperate to form an opening therebetween for improved visibility when the U-shaped headrest is in the upright position.

14 Claims, 5 Drawing Sheets

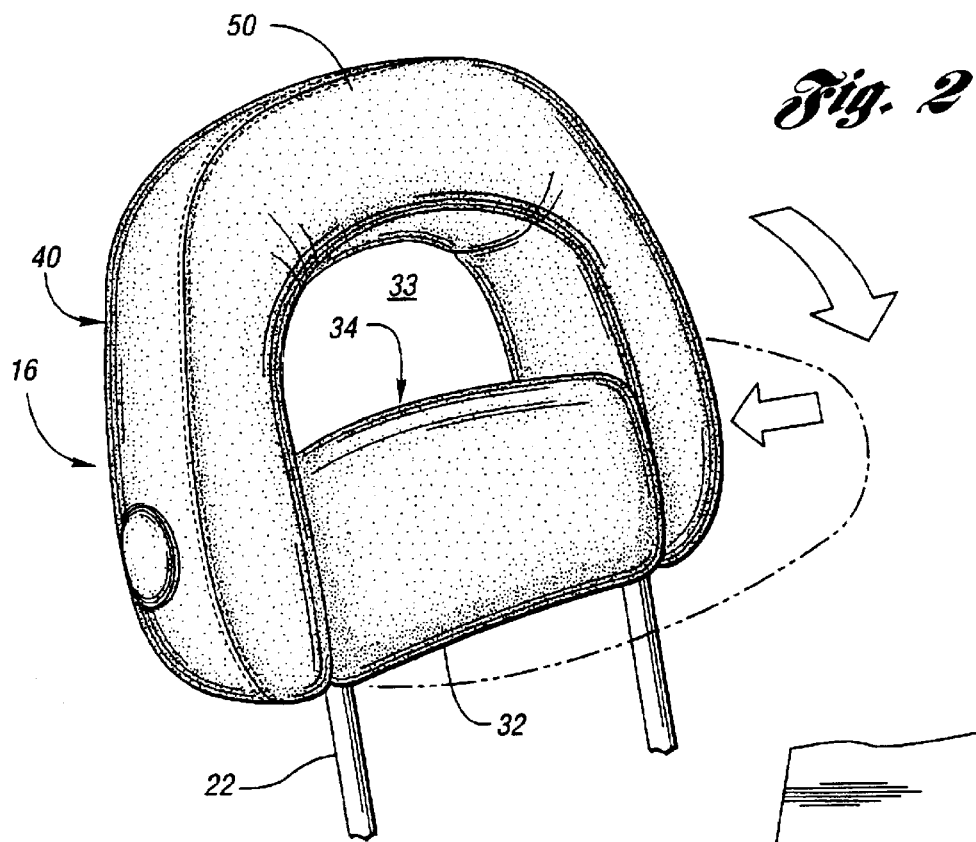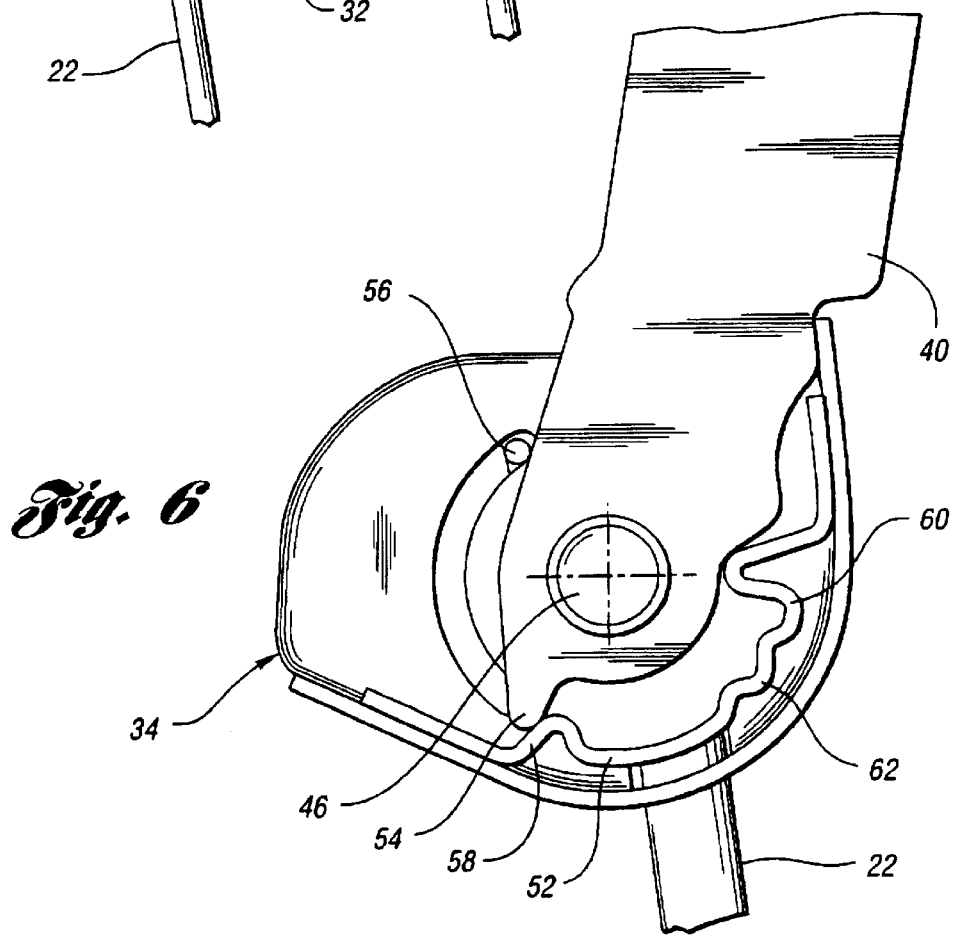

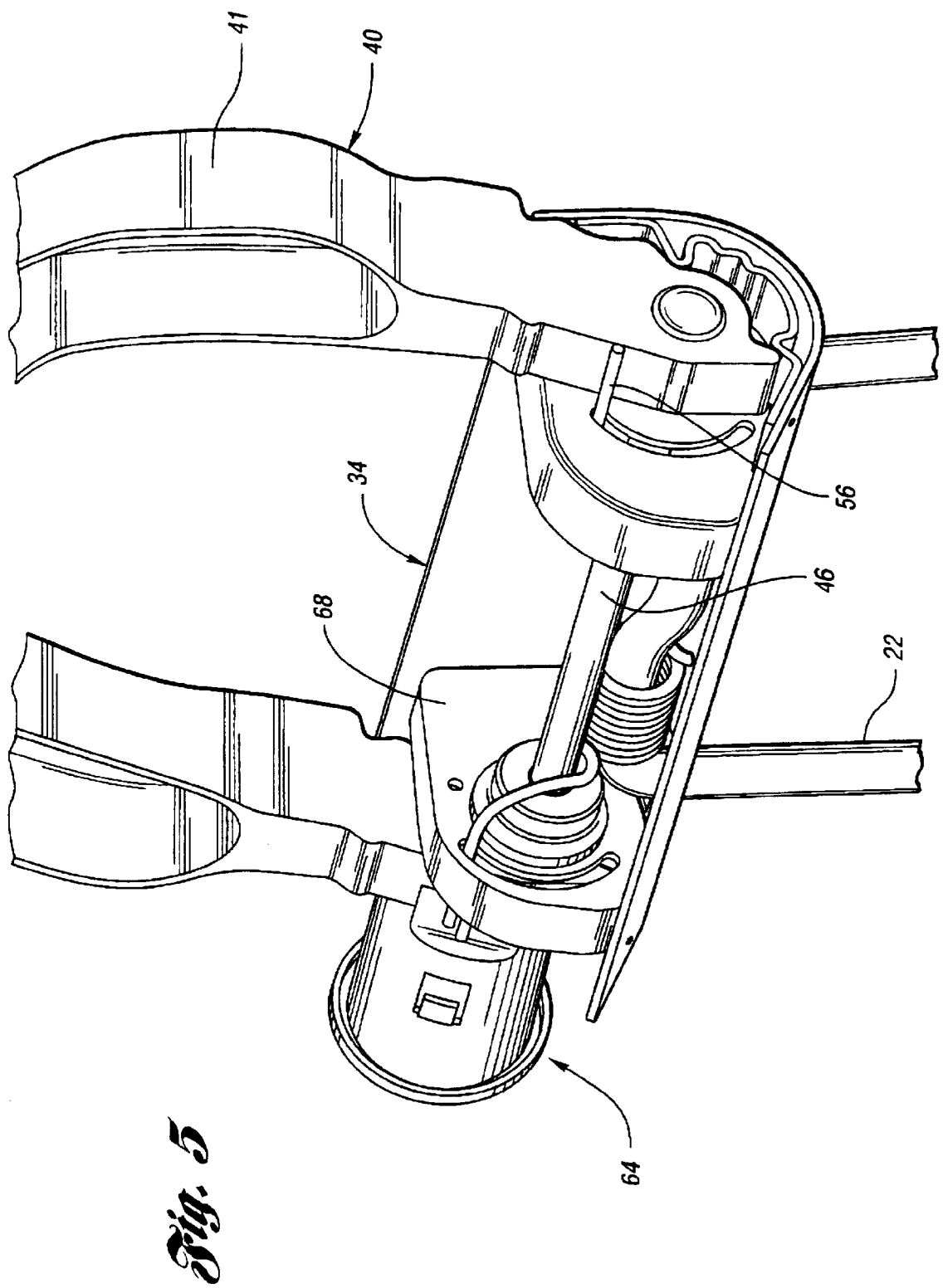

FOLDABLE HALO STYLE HEADREST

TECHNICAL FIELD

The present invention relates to a foldable halo style headrest in which opposing ends of a U-shaped headrest member are connected to opposing ends of a covered, non-pivotable base.

BACKGROUND ART

Recent legislation has required vehicle seat headrests to extend higher in vehicles for improved safety. For example, European legislation requires that the top of the headrest be positioned 750 mm above the hip pivot point, which is substantially higher than most current designs. As a result of these tall seat designs, the collapse of the seat is difficult due to interference caused by the extended height of the headrest. Accordingly, folding headrests have been developed to accommodate such designs and allow tumbling and dumping of tall seats.

The folding headrest also maximizes visibility to the rear of the vehicle when folded, particularly through the rearview mirror, and is therefore a desirable feature, particularly when such folding also enables tumbling and dumping of taller seats.

However, a major problem with existing folding headrests is that they are typically mounted on a support bar, and a cut-out trench is required in the trim cover material along the sides of the headrest to enable attachment of a pivot shaft in a manner in which the pivot shaft is not visible in the vehicle. These cut-out trenches are very difficult and expensive to manufacture because the trim cover material must cover the pivot shaft and its corresponding aperture, which requires significant gluing and stapling operations within the trench, which are undesirable in the manufacturing process.

It is therefore desirable to provide an improved foldable headrest which does not require side trenches for pivoting, while being aesthetically pleasing and fully functional.

DISCLOSURE OF INVENTION

The present invention overcomes the above-referenced shortcomings of prior art headrest assemblies by providing a U-shaped headrest having opposing ends which are pivotally connected to a covered, non-pivotable base. In this design, pivotal movement of the U-shaped headrest is allowed without requiring trenches in either the base or the U-shaped headrest. This design significantly reduces manufacturing costs over prior art designs. This design also allows folding and tumbling of the seat without removing the headrest. Detents are provided within the base for properly positioning the headrest, and the U-shaped headrest is positively locked in the upright position and actuated by a release button.

More specifically, the invention provides a vehicle seat assembly including a seat back with a support post vertically adjustable with respect to the seat back. A cushioned base is non-movably mounted to the support post and covered by a trim cover material. The base has first and second ends. A U-shaped headrest has opposing ends pivotally connected to the first and second ends of the base, respectively. The U-shaped headrest is covered by a trim cover material, and is pivotally movable between an upright position for use and a horizontal position for seat tumbling. The base and the U-shaped headrest cooperate to form an opening therebetween for improved visibility when the U-shaped headrest is in the upright position.

Preferably, the base includes a cam engaged with the U-shaped headrest for selectively positioning the headrest in the upright or horizontal position.

Additionally, an automatic locking mechanism is provided which automatically locks the U-shaped headrest in the upright position once the headrest is moved to the upright position. The locking mechanism includes a release button for unlocking.

Accordingly, an object of the present invention is to provide an improved foldable headrest assembly for a vehicle seat, wherein the assembly does not require trenches formed in the trim cover material for pivoting.

A further object of the present invention is to provide an improved headrest assembly for a vehicle seat which is foldable between upright and collapsed positions, and automatically locks in the upright position.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 2 shows a perspective view of a vehicle seat headrest in accordance with the present invention;

FIG. 5 shows a partially disassembled perspective view of the assembly of FIG. 3; and FIG. 6 shows a partially disassembled side view of the assembly of FIG. 5.

BEST MODE FOR CARRYING OUT THE INVENTION

Figure 1:
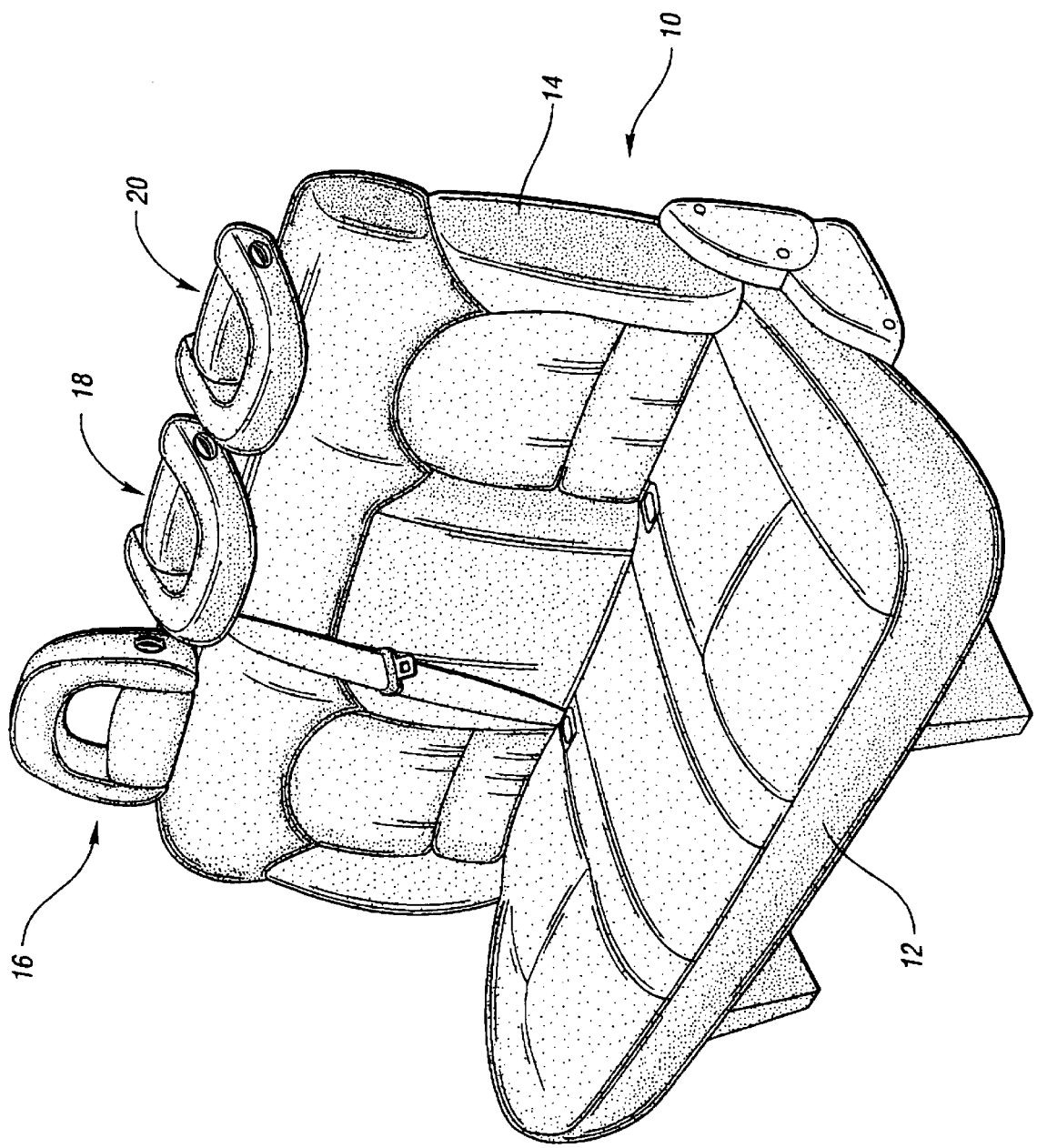
FIG. 1 shows a perspective view of a vehicle seat assembly in accordance with the present invention.

FIG. 1 shows a vehicle seat assembly 10 in accordance with the present invention. The vehicle seat assembly 10 includes a lower seat 12 with a seat back 14 pivotally connected thereto. Headrest assemblies 16, 18, 20 are attached to the top of the seat back 14.

Preferably, the vehicle seat assembly 10 is configured for use as a rear seat in a vehicle, such as a minivan. As illustrated in FIG. 1, the headrest assemblies 16, 18, 20 may be folded forward for improved rear visibility in the vehicle, and also to enable tumbling and dumping of the seat assembly 10 forward in the vehicle.

Figure 3:
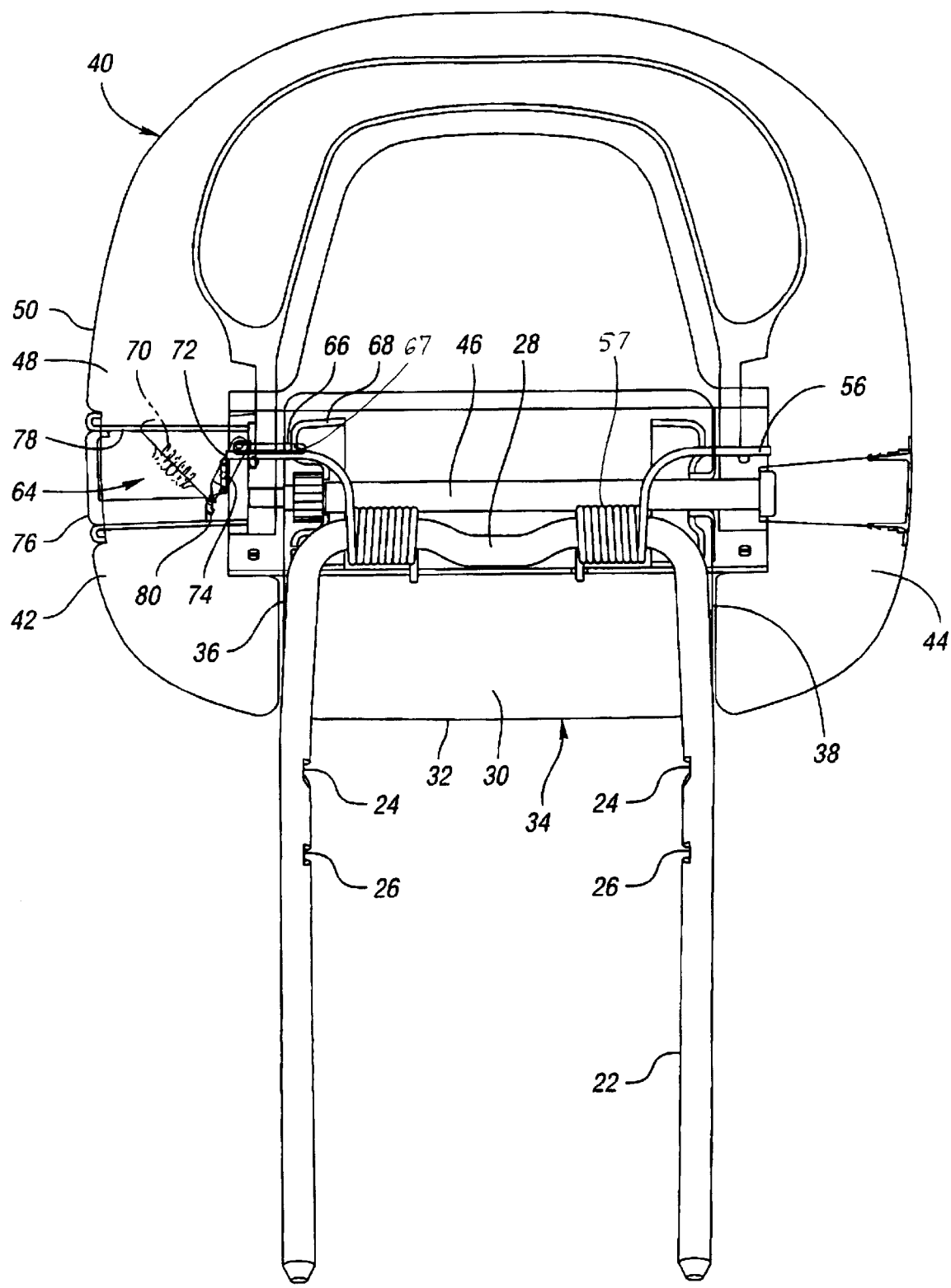
FIG. 3 shows a partially disassembled plan view of the headrest assembly of FIG. 2.

Turning to FIG. 2, a headrest assembly 16 includes a support post 22 which is vertically adjustable with respect to the seat back 14 by means of the notches 24,26 shown in FIG. 3. Preferably, the support post 26 is mounted within generally cylindrical receiving tubes (not shown) mounted in the top of the seat back 14. The support post 22 is accordingly non-pivotally mounted to the seat back 14, but vertically adjustable with respect to the seat back 14. The support post 22 forms a generally U-shaped configuration. Also, the support post 22 is selectively removable from the seat back 14, thereby rendering the entire headrest assembly 16 removable.

As shown in FIG. 2, the base 34 and U-shaped headrest 40 cooperate to form an opening 33 there between for improved visibility when the U-shaped headrest 40 is in the upright position.

Referring to FIGS. 2 and 3, the support post 22 includes an upper portion 28, which is covered by a cushion 30, and the cushion 30 is, in turn, covered by a trim cover material 32. The cushion 30 and trim cover material 32 cooperate to form a base 34 which includes a support portion 68. The base 34 is non-movably mounted to the support post 22. The base 34 includes first and second ends 36,38, respectively.

A U-shaped headrest 40 has opposing ends 42, 44 which are pivotally connected to the first and second ends 36, 38, respectively, of the base 34 along the pivot shaft 46.

The U-shaped headrest also includes a cushion 48, and is covered by a trim cover material 50.

Figure 4:
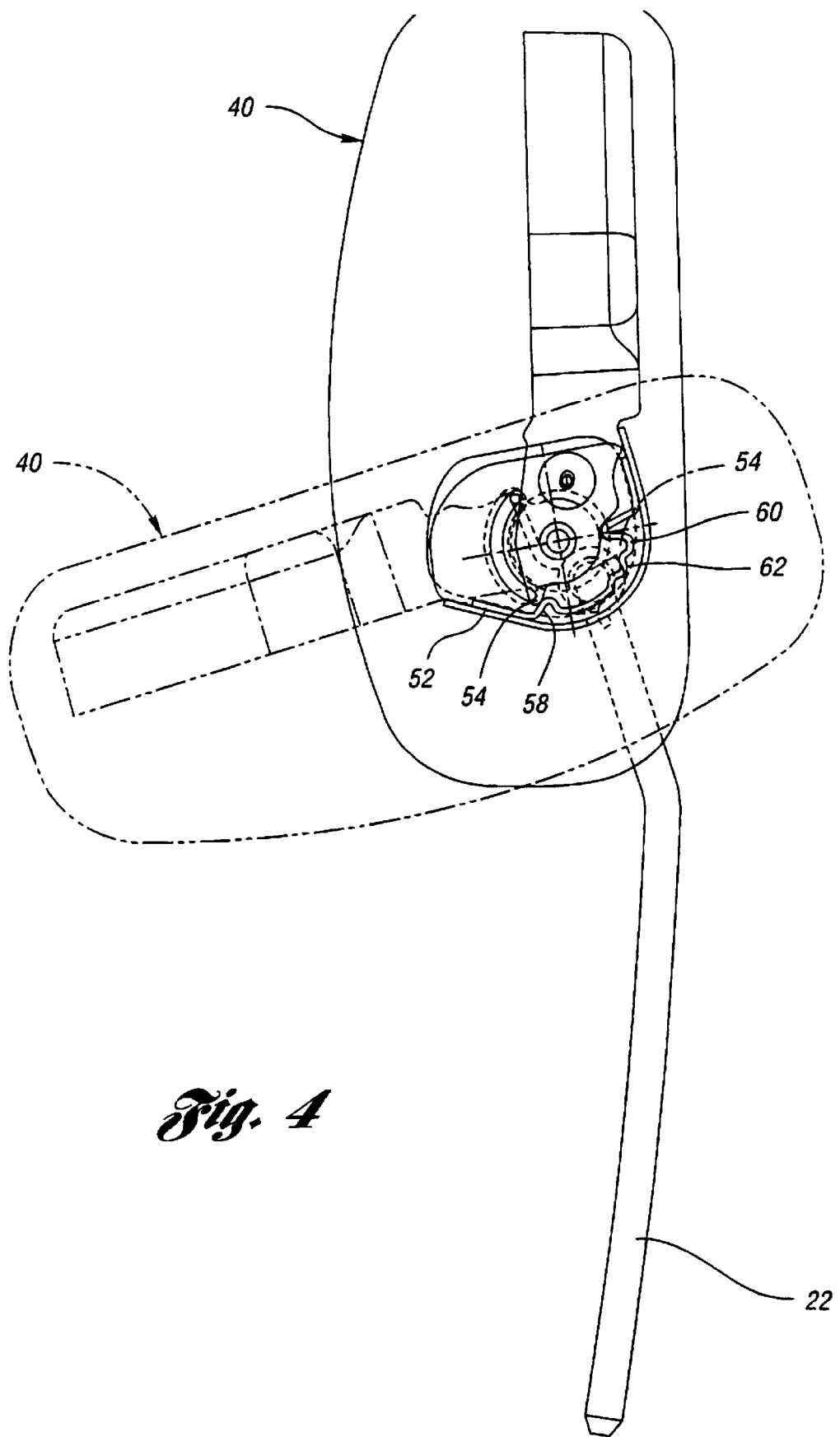
FIG. 4 shows a partially disassembled side view of the headrest assembly of FIG. 3.

As shown in FIG. 4, the U-shaped headrest 40 is pivotally movable about the pivot shaft 46 between the upright position for use, and the horizontal position (shown in phantom in FIG. 4) for seat tumbling.

As most clearly shown in FIGS. 5 and 6, the base 34 includes a spring steel cam 52 having a plurality of detents 58, 60, 62 engageable with a finger 54 of the U-shaped headrest 40. The finger 54 is integrally molded with a halo structure 41 of the U-shaped headrest 40. At least one return spring 56, which includes a coiled portion 57 wrapped around the upper portion 28 of the support post 22, pivotally biases the U-shaped headrest 40 toward the upright position shown in FIG. 6. In this position, the finger 54 engages the first detent 58. The U-shaped headrest 40 is positively locked in the upright position by a mechanism to be described below. Once released, the U-shaped headrest 40 may be pivoted about the pivot shaft 46 against the bias of the return spring 56 to a position of engagement with the second detent 60, as illustrated in phantom in FIG. 4. This position is particularly useful for folding and tumbling seats. A third detent 62 is optionally provided for a normal folding seat.

As shown in FIGS. 3 and 5, an automatic locking mechanism 64 is provided for positively locking the U-shaped headrest 40 in the upright position. Once the U-shaped headrest 40 has been pivoted to the upright position, a lock pin 66 automatically engages a hole 67 formed through the support portion 68 of the base 34 to positively lock the headrest 40 in the upright position.

The automatic locking mechanism 64 includes a spring 70 which pivotally biases a link 72 about a pivot point 74. The link 72 is connected to the lock pin 66 at one end. Accordingly, the bias of the spring 70 causes pivotal movement of the link 72 about the pivot point 74, which causes the lock pin 66 to automatically force itself into the hole 67 formed in the support portion 68 of the base, thereby positively locking the U-shaped headrest 40 in the upright position.

A release button 76 is guided in a channel 78, and engages a first end 80 of the link 72 to cause selective pivotal movement of the link about the pivot point 74, thereby pulling the lock pin 66 away from the hole 67 formed in the support portion 68 of the base, thereby unlocking the headrest 40 for pivotal movement about the pivot shaft 46.

In an alternative embodiment, the spring steel cam 52 may be formed as an over center spring which automatically biases the finger 54 toward opposing positions corresponding with the upright and collapsed positions of the U-shaped headrest 40.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention, as defined in the appended claims.

What is claimed is:

1. A vehicle seat assembly comprising:
   a seat back;
   a support post vertically adjustable with respect to the seat back;
   a base having a cushion therealong and being non-movably mounted to the support post and covered by a trim cover material, said base having first and second ends extending outwardly therefrom;
   a U-shaped headrest having opposing ends and being pivotally connected to said first and second ends of the base, respectively, said U-shaped headrest covered by a trim cover material, and said U-shaped headrest being pivotally movable between an upright position for use and a horizontal position for seat tumbling; and
   wherein the base and U-shaped headrest cooperate to form an opening there between for improved visibility when the U-shaped headrest is in the upright position.

2. The vehicle seat assembly of claim 1, wherein the base includes a cam engaged with the U-shaped headrest for selectively positioning the headrest in the upright or horizontal position.

3. The vehicle seat assembly of claim 2, further comprising a return spring biasing the U-shaped headrest toward the upright position.

4. The vehicle seat assembly of claim 2, further comprising an automatic locking mechanism which automatically locks the U-shaped headrest in the upright position once the headrest is moved to the upright position, said locking mechanism including a release button for unlocking.

5. The vehicle seat assembly of claim 1, wherein the support post is configured to be selectively removable from the seat back.

6. The vehicle seat assembly of claim 1, wherein said support post is non-pivotally mounted with respect to the seat back.

7. A vehicle seat assembly comprising:
   a seat back;
   a support post vertically adjustable with respect to the seat back;
   a base having a cushion therealong and being non-movably mounted to the support post and covered by a trim cover material, said base having first and second ends extending outwardly therefrom;

a U-shaped headrest having opposing ends and being pivotally connected to said first and second ends of the base, respectively, said U-shaped headrest covered by a trim cover material, and said U-shaped headrest being pivotally movable between an upright position for use and a horizontal position for seat tumbling;

wherein the base includes a cam engaged with the U-shaped headrest for selectively positioning the headrest in the upright or horizontal position; and an automatic locking mechanism which automatically locks the U-shaped headrest in the upright position once the headrest is moved to the upright position, said locking mechanism including a release button for unlocking.

8. The vehicle seat assembly of claim 7, further comprising a return spring biasing the U-shaped headrest toward the upright position.

9. The vehicle seat assembly of claim 7, wherein the support post is configured to be selectively removable from the seat back.

10. The vehicle seat assembly of claim 7, wherein said support post is non-pivotally mounted with respect to the seat back.

11. A vehicle seat assembly comprising:

a seat back;

a support post vertically adjustable with respect to the seat back and non-pivotally mounted with respect to the seat back;

a base having a cushion therealong and being non-movably mounted to the support post and covered by a trim cover material, said base having first and second ends extending outwardly therefrom;

a U-shaped headrest having opposing ends and being pivotally connected to said first and second ends of the base, respectively, said U-shaped headrest covered by a trim cover material, and said U-shaped headrest being pivotally movable between an upright position for use and a horizontal position for seat tumbling;

wherein the base includes a cam engaged with the U-shaped headrest for selectively positioning the headrest in the upright or horizontal position.

12. The vehicle seat assembly of claim 11, further comprising a return spring biasing the U-shaped headrest toward the upright position.

13. The vehicle seat assembly of claim 11, further comprising an automatic locking mechanism which automatically locks the U-shaped headrest in the upright position once the headrest is moved to the upright position, said locking mechanism including a release button for unlocking.

14. The vehicle seat assembly of claim 11, wherein the support post is configured to be selectively removable from the seat.

* * * * *